Patented Aug. 29, 1944

2,357,176

UNITED STATES PATENT OFFICE 2,357,176

ANTHRAQUINONE COMPOUNDS

Joseph B. Dickey, Rochester, N. Y., assignor to Eastman Kodak Company, Rochester, N. Y., a corporation of New Jersey No Drawing. Application October 19, 1940, Serial No. 361,975

5 Claims. (Cl. 260—379)

This invention relates to new anthraquinone compounds useful for the coloration of organic derivatives of cellulose, particularly organic derivative of cellulose textile materials. Coloration can be effected by dyeing, printing, stenciling or like methods. It is an object of my invention to provide a new class of anthraquinone compounds.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose such as cellulose acetate-propionate, cellulose acetate-butyrate, and the cellulose ethers such methyl cellulose, ethyl cellulose, or benzyl cellulose. While my invention will be illustrated more particularly in connection with the coloration of cellulose acetate, a material to which the invention is especially adapted, it will be understood that it applies to the coloration of other organic derivatives of cellulose such as those just mentioned.

The anthraquinone compounds of my invention have the general formula:

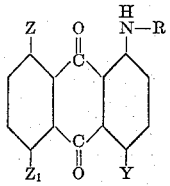

wherein R represents a member selected from the group consisting of a $-X-O-X_1-OH$, a $-X-O-X_1-O-X_2-OH$, and a

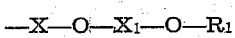

group, wherein X, $X_1$ and $X_2$ each represents the residue of a member selected from the group consisting of an ethyl and a propyl group and $R_1$ represents an unsubstituted alkyl radical, Y, Z and $Z_1$ each represents a member selected from the group consisting of a hydroxy, an amino, an alkylamino, a hydroxyalkylamino, an alkoxyalkylamino, an allylamino, a cycloalkylamino, an aralkylamino, a phenylamino and a furfurylamino group and Z and $Z_1$ may be in addition hydrogen.

The anthraquinone compounds of my invention constitute very valuable dyes for the coloration of organic derivatives of cellulose, such as those hereinbefore mentioned; yielding generally blue shades thereon of good fastness to light and washing. They are especially adapted for the dyeing of cellulose acetate silk. By sulfonation of the compounds of my invention, in accordance with known methods for the introduction of a sulfonic acid group into an anthraquinone nucleus, sulfonated dye compounds are obtained which are suitable for the coloration of silk and wool.

The preparation of the anthraquinone compounds of my invention varies depending upon the particular compound desired. In general the anthraquinone compounds of my invention can be prepared by reacting an amine selected from the group consisting of amines having the general formulae:

$H_2N-X-O-X_1-OH$,
$\quad H_2N-X-O-X_1-O-X_2-OH$
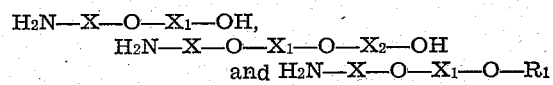

wherein $R_1$, X, $X_1$ and $X_2$ have the meaning assigned to them or an amine having one of the formulae just given together with a primary (alkyl-, hydroxyalkyl-, alkoxyalkyl-, allyl-, cycloalkyl-, aralkyl-, phenyl- or furfuryl-) amine with a leuco α-substituted anthraquinone.

Leuco α-substituted anthraquinones that can be employed include the leuco forms of quinizarin, 1,4,5-trihydroxy anthraquinone, 1,4,5,8-tetrahydroxy anthraquinone, 1,4-di-, 1,4,5-tri- and 1,4,5,8 - tetraaminoanthraquinone, 1 - amino-4-hydroxyanthraquinone, 1,4-dihydroxy-5,8 - diaminoanthraquinone, 1-hydroxy-4-alkylamino-anthraquinone, 1-hydroxy-4-furfurylaminoanthraquinone, 1,4-dialkylaminoanthraquinone and 1-hydroxy-4-phenylaminoanthraquinone.

Anthraquinone compounds of my invention can also be prepared from certain unreduced anthraquinone derivatives such as 1-amino-4-methoxy-anthraquinone, quinizarin, diaminoanthrarufin and 1,5-dimethoxy-4,8-diaminoanthraquinone. In addition, certain anthraquinones containing replaceable nitro groups or halogen atoms when treated with the desired amine or amines can be employed. Illustrative of these latter compounds may be mentioned 1-β-hydroxyethylamino-4-bromoanthraquinone and 1-methylamino-4-nitroanthraquinone.

Compounds of my invention containing a β-hydroxy-β-ethoxyethylamino or a β-hydroxy-β'-ethoxy-β-ethoxyethylamino group, for example, in the 1-position and a hydroxy group in the 4-position can be prepared by condensation of 1 mole equivalent of leuco quinizarin with 1 mole equivalent of β-hydroxyethoxyethylamine or β- hydroxy-β'-ethoxy-β-ethoxyethylamine. Where both the 1- and 4-positions of the anthraquinone nucleus are to be substituted with either one of the groups named, one mole equivalent of leuco quinizarin is condensed with 2 mole equivalents of the amines. Where both of the amine groups named are to be present, condensation may be effected with both amines present or two separate condensations may be carried out each of the two separate condensations being carried out with but one amine present whereby condensation is effected with first one and then the other amine. Where one of the amine groups named is to be present in the 1-position and one of the other amino groups named hereinbefore is to be present in the 4-position, the groups may be introduced in one condensation, or two separate condensations may be carried out similarly as indicated above.

The condensation reactions referred to above may be carried out in water but ordinarily they are conducted in the presence of a solvent diluent such as ethanol, butanol or pyridine. The leuco dye compounds formed by the condensation reactions may be oxidized with air or other suitable oxidizing agents such as sodium perborate or sodium chlorate, for example, in known fashion to obtain the desired dye compounds.

Alkoxyalkylamines and hydroxyalkoxyalkylamines that can be employed in the preparation of the anthraquinone dye compounds of my invention include β-hydroxy-β-ethoxyethylamine, $$H_2N—CH_2CH_2—O—CH_2CH_2OH$$

β-hydroxy-β'-ethoxy-β-ethoxyethylamine, $$H_2N—CH_2CH_2—O—CH_2CH_2—O—CH_2CH_2OH$$

β-methoxy-β-ethoxyethylamine, $$H_2N—CH_2CH_2—O—CH_2CH_2—OCH_3$$

β'-ethoxy-β-ethoxyethylamine, $$H_2N—CH_2CH_2—O—CH_2CH_2—OC_2H_5$$

β-butoxy-β-ethoxyethylamine, $$H_2N—CH_2CH_2—O—CH_2CH_2—OC_4H_9$$

γ-hydroxy-γ-propoxy propylamine, $$H_2N—CH_2CH_2CH_2—O—CH_2CH_2CH_2OH$$

γ-hydroxy-γ'-propoxy-γ-propoxy propylamine, $$H_2N—CH_2CH_2CH_2—O—CH_2CH_2CH_2—O—CH_2CH_2CH_2OH$$

β-hydroxy-β-propoxy propylamine,

β-hydroxy-β-propoxy ethylamine, $$H_2N—CH_2CH_2—O—CH_2CHOHCH_3$$

β-hydroxy-β'-propoxy-β-propoxy propylamine,

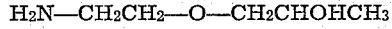

γ-methoxy-γ-propoxy propylamine, $$H_2N—CH_2CH_2CH_2—O—CH_2CH_2CH_2—OCH_3$$

and β-ethoxy-β-propoxy propylamine,

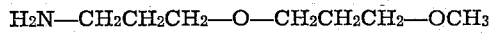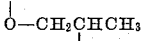

During the investigation of the compounds of my invention, I have discovered that if certain mixtures of amines are employed, dye mixtures having very advantageous properties are obtained. These dye mixtures possess a high melting point and, because of this, possess the advantages of being easily prepared into dispersible mixtures, of dispersing more readily and of having less tendency to conglomerate in the dyebath. By being more readily dispersible and having less tendency to conglomerate, evenness of dyeing is promoted. The preparation of these advantageous dye mixtures is described completely hereinafter.

The following examples illustrate the preparation of the compounds of my invention:

Example 1

24 grams of leuco quinizarin are heated in 200 cc. of butanol with 10.5 grams of β-hydroxy-β-ethoxyethylamine for 4 hours. The resulting leuco dye is poured into water and oxidized with sodium perborate. The dye compound obtained, 1-β-hydroxy-β-ethoxy ethylamino-4-hydroxyanthraquinone is recovered by filtration, washed with water and dried. It colors cellulose acetate silk violet.

By the substitution of 27.2 grams of leuco 1,4,5,8-tetrahydroxyanthraquinone for the leuco quinizarin of the example, 1-β-hydroxy-β-ethoxyethylamino-4,5,8-trihydroxyanthraquinone is obtained. This dye compound colors cellulose acetate silk purple. Similarly, if equivalent gram molecular weights of β-hydroxy-β'-ethoxy-β-ethoxyethylamine, γ-hydroxy-γ-propoxypropylamine and β-hydroxy-β-propoxypropylamine are used in place of β-hydroxy-β-ethoxyethylamine and reacted with leuco quinizarin, 1-β-hydroxy-β'-ethoxy-β-ethoxyethylamino-4-hydroxyanthraquinone, 1-γ-hydroxy-γ-propoxypropylamino-4-hydroxyanthraquinone and 1-β-hydroxy-β-propoxypropylamino-4-hydroxyanthraquinone are obtained.

Example 2

24 grams of leuco quinizarin are refluxed in 200 cc. of butanol together with 22 grams of β-hydroxy-β-ethoxyethylamine for 4 hours. Upon working up in accordance with the method described in Example 1, 1,4-di-mono-β-hydroxy-β-ethoxyethylaminoanthraquinone is obtained. This dye compound colors cellulose acetate silk blue.

Example 3

24 grams of leuco quinizarin, 10.5 grams of β-hydroxy-β-ethoxyethylamine, 15 grams of β-hydroxy-β'-ethoxy-β-ethoxyethylamine and 200 cc. of butanol are refluxed together for 4 hours and the resulting leuco dye is oxidized in the reaction vessel by adding hydrogen peroxide. The dye compound formed can be recovered by concentrating the reaction mixture or by adding water and filtering. The 1-β-hydroxy-β'-ethoxy-β-ethoxyethylamino-4-β-hydroxy-β-ethoxyaminoanthraquinone obtained colors cellulose acetate silk blue.

By the substitution of 27.2 grams of leuco 1,4,5,8-tetrahydroxyanthraquinone for the leuco quinizarin of the example, 1-β-hydroxy-β'-ethoxy-β-ethoxyethylamino-4-β-hydroxy-β-ethoxyethylamino-5,8-dihydroxyanthraquinone can be obtained. This latter dye compound colors cellulose acetate silk greenish-blue.

Example 4

6 grams of leuco quinizarin, 18 grams of quinizarin, 3.2 grams of methylamine, 200 cc. of butanol and 10.5 grams of β-hydroxy-β-ethoxyethylamine are refluxed together for 4 hours and the reaction mixture is worked up in accordance with the procedure described in Example 1. 1-β-hydroxy-β-ethoxyethylamino-4-methylaminoanthraquinone is obtained and colors cellulose acetate silk blue.

By the substitution of an equivalent gram molecular weight of ethylamine, n-propylamine, isopropylamine, butylamine, cetylamine and β-hydroxy-β′-propoxy-β-propoxypropylamine for the methylamine of the example, anthraquinone compounds, in which the methylamino group is replaced by an ethylamino, n-propylamino, an isopropylamino, a butylamino, a cetylamino and a β-hydroxy-β′-propoxy-β-propoxypropylamino group, respectively, are obtained.

Example 5

6 grams of leuco quinizarin, 18 grams of quinizarin, 200 cc. of pyridine, 10 grams of cyclohexylamine and 15 grams of β-hydroxy-β′-ethoxy-β-ethoxyethylamine are refluxed together for 6 hours. The leuco dye compound formed is oxidized by passing in air and the desired dye compound is recovered from the reaction mixture by adding water and filtering. 1-β-hydroxy-β′-ethoxy-β-ethoxyethylamino-4-cyclohexylaminoanthraquinone is obtained and colors cellulose acetate silk blue.

Example 6

24 grams of leuco 1,4-diaminoanthraquinone, 200 cc. of butanol, 10.5 grams of β-hydroxy-β-ethoxyethylamine and 6 grams of allylamine are refluxed together for 4 hours and the reaction mixture is worked up as described in Example 1. 1-β-hydroxy-β-ethoxyethylamino-4-allylamino anthraquinone is obtained and colors cellulose acetate silk blue.

Example 7

24 grams of leuco 1-hydroxy-4-aminoanthraquinone, 400 cc. of ethanol, 15 grams of β-hydroxy-β′-ethoxy-β-ethoxyethylamine and 11 grams of benzylamine are refluxed together for 6 hours and the reaction product is worked up in accordance with the procedure described in Example 1. 1-β-hydroxy-β′-ethoxy-β-ethoxyethylamino-4-benzylaminoanthraquinone is obtained and colors cellulose acetate silk blue.

Example 8

24 grams of leuco quinizarin, 250 cc. of butanol and 11 grams of p-phenylenediamine are heated under reflux for 10 hours. Following this, 11 grams of β-hydroxy-β-ethoxyethylamine are added and refluxing is continued until no further color change takes place. The reaction mixture is worked up in accordance with the procedure described in Example 1. 1-β-hydroxy-β-ethoxyethylamino-4-(4′-amino)-phenylaminoanthraquinone is obtained and colors cellulose acetate silk bluish-green. If desired, boric acid or a mixture of boric acid and sodium chlorate may be employed in the reaction as catalysts.

Example 9

24 grams of leuco quinizarin, 200 cc. of butanol, 15 grams of β-hydroxy-β′-ethoxy-β-ethoxyethylamine and 10.1 grams of tetrahydrofurfurylamine are refluxed together for 10 hours following which the reaction mixture is worked up in accordance with the procedure described in Example 1. 1-β-hydroxy-β′-ethoxy-β-ethoxyethylamino-4-tetrahydrofurfurylaminoanthraquinone is obtained and colors cellulose acetate silk blue.

Example 10

25.3 grams of 1-amino-4-methoxyanthraquinone are dissolved in butanol heated to 110° C. and 10.5 grams of β-hydroxy-β-ethoxyethylamine are added dropwise over a period of 2 hours followed by heating for an additional hour. The dye compound is precipitated by concentrating the reaction mixture following which it can be recovered by filtration. 1-β-hydroxy-β-ethoxyethylamino-4-aminoanthraquinone is obtained. It colors cellulose acetate silk reddish-blue.

Example 11

31.3 grams of 1-β-hydroxyethylamino-4-bromoanthraquinone are heated in pyridine in an autoclave at 200° C. with 40 grams of β-hydroxy-β′-ethoxyethylamine for 20 hours. 1-β-hydroxy-β′-ethoxy-β-ethoxyethylamino-4-β-hydroxyethylaminoanthraquinone is recovered from the reaction mixture and colors cellulose acetate silk blue.

Example 12

27 grams of 1,5-diamino-4,8-dihydroxyanthraquinone are heated with 250 grams of β-hydroxy-β-ethoxyethylamine at 100–160° C. until no further color change towards blue-green takes place. Water is then added to the reaction mixture and the precipitated dye compound is recovered by filtration, washed with water and dried. 1,5-di-mono-β-hydroxy-β-ethoxyethylamino-4,8-diaminoanthraquinone is obtained and colors cellulose acetate silk greenish-blue.

Example 13

27 grams of leuco 1,4,5,8-tetraaminoanthraquinone are heated in 250 cc. of butanol together with 25 grams of β-hydroxy-β-ethoxyethylamine under reflux for 10 hours. The resulting leuco dye compound is worked up as described in Example 1. 1,4-di-mono-β-hydroxy-β-ethoxyethylamino-5,8-diaminoanthraquinone is obtained and colors cellulose acetate silk greenish-blue.

Example 14

To a mixture of 1.94 grams of leuco quinizarin, 3.35 grams of 86% quinizarin and 0.35 gram of sodium carbonate was added a mixture of 1.32 grams of β-hydroxy-β-ethoxyethylamine and 2.73 grams of 33.3% methylamine in 20 cc. of n-butanol. The reactants were refluxed for 10 hours and then oxidized by adding 5 cc. of water and 2.5 grams of sodium perborate to the hot reaction mixture and heating for one hour. The dye product was recovered by pouring the reaction mixture into one and one-half liters of hot water, stirring, filtering, washing with water and drying. The dye mixture obtained consists essentially of anthraquinone compounds substituted only in their 1 and 4 positions with a monomethylamino group or a mono-β-hydroxy-β-ethoxyethylamino group, said groups being present in the ratio of 3 mole parts of the mono-β-hydroxy-β-ethoxyethylamino group to 7 mole parts of the monomethylamino group. The product obtained colors cellulose acetate silk blue.

Example 15

To a mixture of 1.94 grams of leuco quinizarin, 3.35 grams of 86% quinizarin and 0.35 gram of sodium bicarbonate was added a mixture of 1.88 grams of β-hydroxy-β′-ethoxy-β-ethoxyethylamine and 2.73 grams of 33.3% methylamine in 20 cc. of n-butanol. The reactants were refluxed 8–10 hours and then oxidized by adding 5 cc. of water and 2.5 grams of sodium perborate portionwise to the hot reaction mixture and heating for one hour. The reaction mixture was then poured into one and one-half liters of hot water, stirred, filtered and the dye mixture recovered by filtration, washed with water and dried. The dye mixture obtained consists essentially of anthraquinone compounds substituted only in their 1 and 4 positions with a monomethylamino group or a mono-β-hydroxy-β'-ethoxy-β-ethylamino group, said groups being present in the ratio of 7 mole parts of the mono-β-hydroxy-β'-β-ethoxyethylamino group to 3 mole parts of the monomethylamino group, and colors cellulose acetate silk blue. 5.5 grams or an 81.7% yield was obtained.

*Example 16*

To a mixture of 2.2 grams of leuco 1,4,5,8-tetra-hydroxyanthraquinone and 0.35 gram of sodium carbonate was added a mixture of 1.32 grams of β-hydroxy-β-ethoxyethylamine and 2.73 grams of 33.3% methylamine in 20 cc. of butanol. The reactants were refluxed for ten hours and then oxidized by adding 5 cc. of water and 2.5 grams of sodium perborate portionwise to the hot reaction mixture and heating for one hour. The reaction mixture was poured into water and the dye mixture formed by the reaction, recovered by filtration, washed with water and dried. The dye mixture obtained consists essentially of anthraquinone compounds substituted in both their 5 and 8 positions with a hydroxy group and substituted in their 1 and 4 positions with a monomethylamino group or a mono-β-hydroxy-β-ethoxyethylamino group said groups being present in the ratio of 7 mole parts of the monomethylamino group to 3 mole parts of the mono-β-hydroxy-β-ethoxyethylamino group, and colors cellulose acetate silk greenish-blue.

*Example 17*

To a mixture of 1.94 grams of leuco quinizarin, 3.35 grams of 86% quinizarin and 0.35 gram of sodium bicarbonate was added a mixture of 1.68 grams of β'-ethoxy-β-ethoxyethylamine and 2.73 grams of 33.3% methylamine in 20 cc. of n-butanol. The reactants were refluxed for 10 hours and then oxidized by adding 5 cc. of water and 2.5 grams of sodium perborate portionwise to the hot reaction mixture and heating for one hour. The reaction mixture was then poured into one and one-half liters of hot water, stirred and the precipitated dye product recovered by filtration, washed with water and dried. The dye mixture obtained consists essentially of anthraquinone compounds substituted only in their 1 and 4 positions with a monomethylamino group or a mono-β'-ethoxy-β-ethoxyethylamino group said groups being present in the ratio of 7 mole parts of the monomethylamino group to 3 mole parts of the mono-β'-ethoxy-β-ethoxyethylamino group, and colors cellulose acetate silk blue. The dye mixture obtained begins to soften at 120° C. and sludges and melts at 170–185° C. 5.3 grams or an 80.8% yield was obtained.

.1 gram mole of γ-hydroxy-γ'-propoxy-γ-propoxypropylamine, β-hydroxy-β-propoxyethylamine, β-hydroxy-β'-propoxy-β-propoxypropylamine, γ-methoxy-γ-propoxypropylamine or β-ethoxy-β-propoxypropylamine, for example, can be reacted with .1 gram mole of leuco quinizarin in the presence of a solvent such as butanol in accordance with the procedure described hereinbefore to obtain 1-γ-hydroxy-γ'-propoxy-γ-propoxypropylamino-4-hydroxyanthraquinone, 1-β-hydroxy-β-propoxyethylamino-4-hydroxyanthraquinone, 1-β-hydroxy-β'-propoxy-β-propoxypropylamino-4-hydroxyanthraquinone, 1-γ-methoxy-γ-propoxypropylamino-4-hydroxyanthraquinone and 1-β-ethoxy-β-propoxypropylamino-4-hydroxyanthraquinone, respectively.

Additional dye compounds which can be prepared in accordance with my invention include 1-β-hydroxy-β'-ethoxy-β-ethoxyethylamino-4-(4'-β-hydroxyethylamino)phenylaminoanthraquinone, 1-β-hydroxy-β-ethoxyethylamino-4-(4'-amino)-phenylamino-5,8-diaminoanthraquinone, 1-β-hydroxyethylamino-4-β-hydroxy-β'-ethoxy-β-ethoxyethylamino-5,8-dihydroxyanthraquinone, 1-β-hydroxy-β-ethoxyethylamino-4-cyclohexylamino-5,8-dihydroxyanthraquinone, 1-tetrahydrofurfurylamino-4-β-hydrxy-β-ethoxyethylamino-5,8-dihydroxyanthraquinone, 1-β-hydroxy-β-ethoxyethylamino-4-(4'-amino)-phenylamino-5,8-dihydroxyanthraquinone, 1-β-hydroxy-β-ethoxyethylamino-4,5-dimethylamino-8-hydroxyanthraquinone and 1-methylamino-4,5-di-β-hydroxy-β-ethoxyethylamino-8-hydroxyanthraquinone. These dye compounds color cellulose acetate silk bluish green. Additional dyes which yield greenish-blue shades on cellulose acetate silk include 1,4-di-β-hydroxy-β'-ethoxy-β-ethoxyethylamino-5,8-dihydroxyanthraquinone and 1-β-hydroxy-β'-ethoxy-β-ethoxyethylamino-4-β-hydroxyethylamino-5-aminoanthraquinone.

The unsulfonated compounds of my invention, as previously noted, can be sulfonated to yield dye compounds suitable for the dyeing of wool and silk. Sulfonation can be effected using chlorsulfonic or fuming sulphuric acid, for example, to introduce one or more sulfonic acid groups.

In order that the preparation of the compounds of my invention may be entirely clear, the preparation of various alkoxyalkylamines is indicated hereinafter.

*Preparation of β-hydroxy-β-propoxy propylamine*

One gram mole of di-propylene glycol, 20 grams of Raney nickel and 5 moles of ammonia are charged into a shaking autoclave and heated with shaking at 220–240° C. for 20 hours. The autoclave is then cooled and the reaction mixture removed and distilled under reduced pressure. A good yield (35%) of β-hydroxy-β-propoxy propylamine and

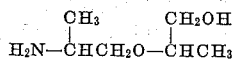

is obtained.

*Preparation of β-hydroxy-β-ethoxyethylamine and β-hydroxy-β'-ethoxy-β-ethoxyethylamine*

These compounds can be prepared by reacting one gram mole of diethylene glycol and triethylene glycol, respectively, with ammonia in the presence of Raney nickel in accordance with the procedure described above.

*Preparation of γ-methoxy-γ-propoxy propylamine and γ-ethoxy-γ-propoxy propylamine*

These compounds can be prepared by reacting one gram mole of HO(CH₂)₃O(CH₂)₃OCH₃ and HO(CH₂)₃O(CH₂)₃OC₂H₅, respectively, with ammonia in the presence of Raney nickel in accordance with the general procedure described hereinbefore.

The glycols employed in the reaction can be prepared by reacting two molecular equivalents of trimethylene oxide with one molecular equivalent of methanol and ethanol, respectively, in an autoclave at a temperature of 175–250° C.

*Preparation of γ-hydroxy-γ-propoxy propylamine*

This compound can be prepared by reacting

HO(CH₂)₃O(CH₂)₃OH with ammonia in the presence of Raney nickel in accordance with the general procedure described hereinbefore.

*Preparation of β-methoxy-β-propoxy propylamine*

This compound can be prepared by reacting

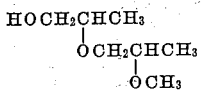

with ammonia in the presence of Raney nickel following the procedure which has been previously described.

The glycol employed in the above example can be prepared by heating two molecular equivalent weights of propylene oxide with one molecular equivalent weight of methanol in an autoclave at a temperature of 175–250° C.

*Preparation of β-methoxy-β'-propoxy-β-propoxy propylamine*

This compound can be prepared by reacting

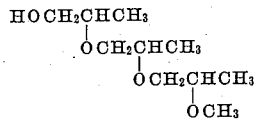

with ammonia in the presence of Raney nickel in accordance with the procedure previously described. The glycol employed in this reaction can be prepared by reacting three molecular equivalent weights of propylene oxide with one molecular equivalent weight of methanol in an autoclave at a temperature of 175–250° C.

β-hydroxy-β'-propoxy-β-propoxy propylamine can be prepared in a similar manner by reacting

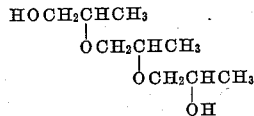

with ammonia in the presence of Raney nickel. The glycol employed in this reaction can be purchased.

From the foregoing, the preparation of the alkoxy alkylamines employed in the manufacture of the anthraquinone dye compounds of my invention is believed to be clear to those skilled in the art. Other alkoxy alkylamines can be prepared in similar fashion.

The anthraquinone dye compounds of my invention can be applied to the coloration of organic derivatives of cellulose such as cellulose acetate silk by the well known dispersion method. In accordance with this method of dyeing, the insoluble dye or dye mixture can be first ground to a fine powder, intimately mixed with a suitable dispersing or solubilizing agent following which the resulting mixture is added to water or a dilute solution of soap in water to form an aqueous dyebath. After this known preparation of the dyebath, the textile materials, for example, to be dyed may be added to the dyebath and the dyeing operation conducted in known fashion. Suitable dispersing or solubilizing agents that can be employed include soap, sulphoricinoleic acid, salts of sulphoricinoleic acid, a water soluble salt of cellulose phthalate, cellulose succinate or cellulose mono-acetate diphthalate, for example, the sodium, potassium or ammonium salts, and sulfonated oleic, stearic or palmitic acid, or salts thereof, such, for example, as the sodium or ammonium salts.

The following example illustrates how dyeing may be carried out in accordance with my invention. Quantities are expressed in parts by weight.

*Example A*

2 parts of the dye mixture of Example 14 are finely ground with a dispersing agent such as soap or oleyl glyceryl sulfate and the resulting paste is dispersed in 1000 parts of water. The dispersion thus prepared is heated to a temperature approximating 45–55° C. and 100 parts of cellulose acetate silk in the form of yarn or fabric, for example, are added to the dyebath after which the temperature is gradually raised to 80–85° C. and the silk worked at this temperature until dyeing is complete. Sodium chloride may be added as desired during the dyeing operation to promote exhaustion of the dyebath. Upon completion of the dyeing operation, the cellulose acetate silk is removed, washed with soap, rinsed and dried. The cellulose acetate silk is colored a blue shade of excellent fastness to light and washing.

While my invention has been illustrated in connection with the dyeing of cellulose acetate silk, it will be understood that dyeing operations can be carried out in a manner similar to that described above by the substitution of another organic derivative of cellulose material for cellulose acetate silk or by employing dye compounds other than those employed in the example or by substitution of both the material being dyed and the dye compound of the example. Wool and silk can be colored with the anthraquinone dyes of my invention in accordance with the methods known to the art for the coloration of these materials with anthraquinone dyes. It will be understood, however, that these materials can be colored in accordance with the dispersion method of dyeing just described.

I claim:

1. Anthraquinone compounds having the general formula:

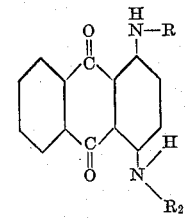

wherein R represents a member selected from the group consisting of a —CH₂CH₂OCH₂CH₂OH, a —CH₂CH₂—O—CH₂CH₂—O—CH₂CH₂OH and a —CH₂CH₂—O—CH₂CH₂—O—R₁ group, wherein R₁ represents an unsubstituted alkyl group, and R₂ represents an unsubstituted alkkyl group.

2. Anthraquinone compounds having the general formula:

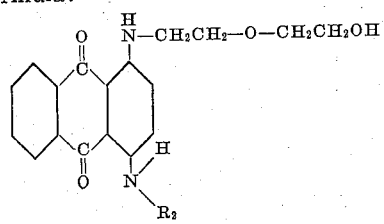

wherein $R_2$ represents an unsubstituted alkyl group.

3. An anthraquinone dye mixture consisting essentially of anthraquinone compounds substituted only in their 1 and 4 positions with a member selected from the group consisting of a $$-\overset{H}{N}-C_2H_4-O-C_2H_4OH$$

and a $$-\overset{H}{N}-CH_3\text{*}$$

group and wherein said groups are present in the ratio of 3 mole parts of the $$-\overset{H}{N}-C_2H_4-O-C_2H_4OH$$

group to 7 mole parts of the $$-\overset{H}{N}-CH_3$$

group.

4. An anthraquinone dye mixture consisting essentially of anthraquinone compounds substituted only in their 1 and 4 positions with a member selected from the group consisting of a $$-\overset{H}{N}-C_2H_4-O-C_2H_4-O-C_2H_4OH$$

and a $$-\overset{H}{N}-CH_3$$

group and wherein said groups are present in the ratio of 3 mole parts of the $$-\overset{H}{N}-C_2H_4-O-C_2H_4-O-C_2H_4OH$$

group to 7 mole parts of the $$-\overset{H}{N}-CH_3$$

group.

5. An anthraquinone dye mixture consisting essentially of anthraquinone compounds substituted only in their 1 and 4 positions with a member selected from the group consisting of a $$-\overset{H}{N}-C_2H_4-O-C_2H_4-OC_2H_5$$

and a $$-\overset{H}{N}-CH_3$$

group and wherein said groups are present in the ratio of 3 mole parts of the $$-\overset{H}{N}-C_2H_4-O-C_2H_4-OC_2H_5$$

group to 7 mole parts of the $$-\overset{H}{N}-CH_3.$$

group.

JOSEPH B. DICKEY.